United States Patent
Chen

(10) Patent No.: US 10,678,618 B2
(45) Date of Patent: Jun. 9, 2020

(54) MANAGING NODE FAILURES IN A COMPUTING ENVIRONMENT

(71) Applicant: Red Hat, Inc., Raleigh, NC (US)

(72) Inventor: Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 148 days.

(21) Appl. No.: 15/915,397

(22) Filed: Mar. 8, 2018

(65) Prior Publication Data

US 2019/0278644 A1 Sep. 12, 2019

(51) Int. Cl.
G06F 11/00 (2006.01)
G06F 11/07 (2006.01)
G06Q 10/06 (2012.01)
H04L 29/08 (2006.01)

(52) U.S. Cl.
CPC ........ G06F 11/0709 (2013.01); G06F 11/079 (2013.01); G06Q 10/0635 (2013.01); H04L 67/10 (2013.01)

(58) Field of Classification Search
CPC .............. G06F 11/0709; G06F 11/079; G06Q 10/0635; H04L 67/10
USPC ......................................................... 714/37
See application file for complete search history.

(56) References Cited

U.S. PATENT DOCUMENTS 6,446,218 B1 * 9/2002 D'Souza ................. G06Q 30/06 714/4.4
8,584,128 B1 * 11/2013 Don ...................... G06F 9/5011 718/100
9,645,811 B2 5/2017 Carlen et al.
9,864,609 B1 1/2018 McClure et al.
10,141,955 B2 * 11/2018 Andrade Costa ... G06F 11/1048
2018/0247239 A1 * 8/2018 Horrell ................. G06F 11/004

FOREIGN PATENT DOCUMENTS

WO 2012/083270 A1 6/2012

OTHER PUBLICATIONS

"Pods II Kubernetes Workflow," Dec. 28, 2017, https://hk.saowen.com/a/33a7b41bc4632585ec24e90fccc97c0cba582b359b078897579f446a8df4ad43.
"Open Shift Container Platform 3.3 Cluster Administration," Red Hat, Inc., Jan. 12, 2018, https://access.redhat.com/documentation/en-US/OpenShift_Container_Platform/3.3/pdf/Cluster_Administration/OpenShift_Container_Platform-3.3-Cluster_Administration-en-US.pdf.
"Oracle® Container Services for use with Kubernetes User's Guide," Dec. 2017, https://clocs.oracle.com/cd/E52668_01/E88884/E88884.pdf.
"ReplicaSet," https://kubernetes.io/docs/concepts/workloads/controllers/replicaset/.
"Kubernetes Documentation," Oct. 23, 2017, http://leoh0.github.io/images/kubernetes-documents.pdf.

* cited by examiner

Primary Examiner — Yair Leibovich
(74) Attorney, Agent, or Firm — Kilpatrick Townsend & Stockton LLP

(57) ABSTRACT

Node failures in a computing environment can be managed. For example, a computing device can determine a risk score for a node in the computing environment. The risk score can indicate a likelihood of the node failing. The computing device can also determine a risk-tolerance score for a job to be executed in the computing environment by analyzing job data associated with the job. The risk-tolerance score can indicate a susceptibility of the job to a failure of one or more nodes in the computing environment. The computing device can cause the job to be at least partially executed on the node based on the risk score for the node and the risk-tolerance score for the job.

20 Claims, 4 Drawing Sheets

MANAGING NODE FAILURES IN A COMPUTING ENVIRONMENT

TECHNICAL FIELD

The present disclosure relates generally to computer network management. More specifically, but not by way of limitation, this disclosure relates to managing node failures in a computing environment.

BACKGROUND

A computing environment can include multiple nodes in communication with one another via a network. The nodes are typically used to execute jobs, such as data-processing jobs. But the nodes can fail (completely or partially) for a variety of reasons. For example, the nodes can fail in response to filesystem or kernel errors. And node failures can lead to a variety of other problems. For example, each node in the computing environment will have certain computing resources allocated to it. And if a node fails, these computing resources typically cannot be released until the node is rebooted.

DETAILED DESCRIPTION

Figure 1:
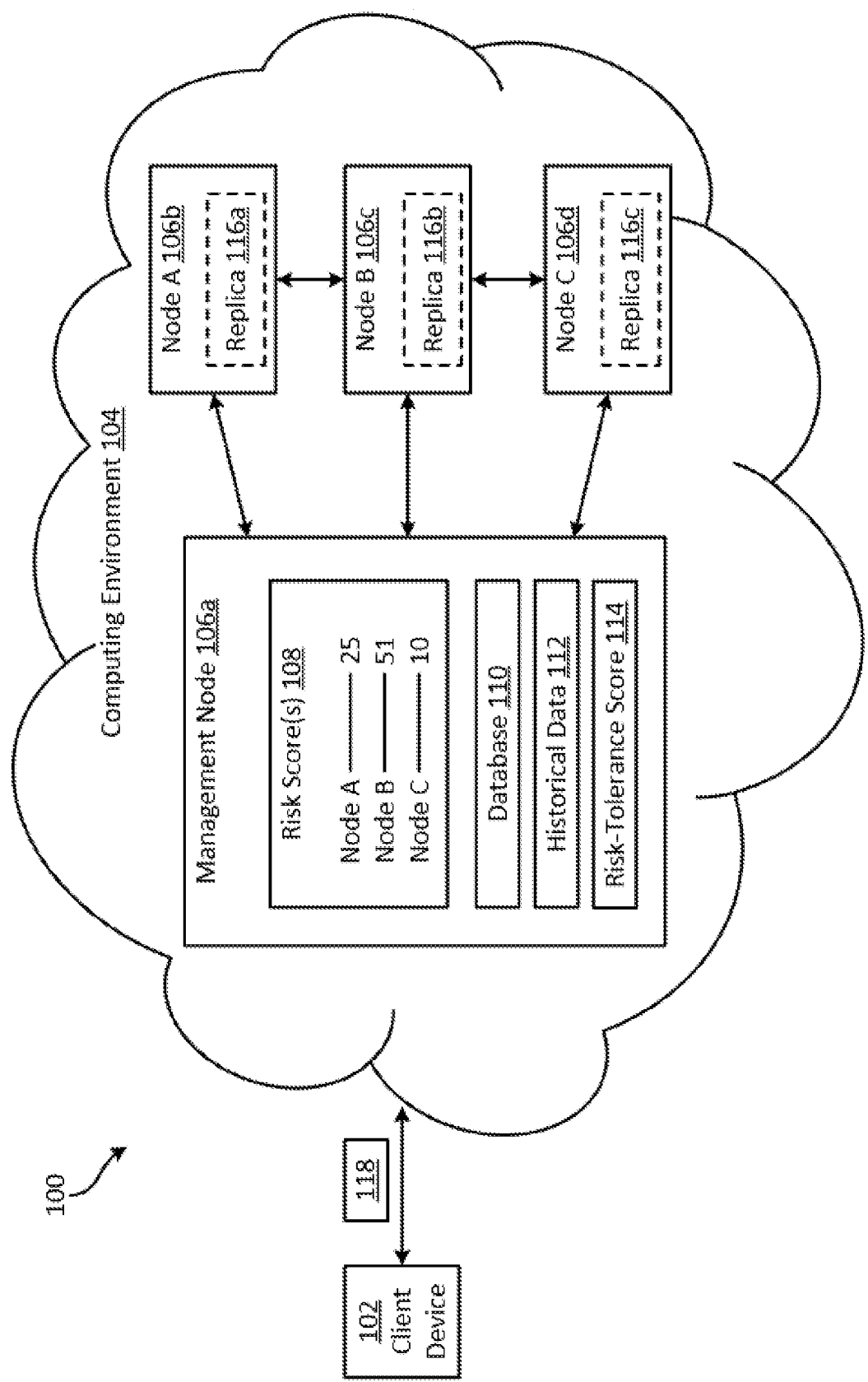
FIG. 1 is a block diagram of an example of a system for managing node failures in a computing environment according to some aspects.

Nodes in a computing environment can fail. And valuable computing resources can be tied up until the failed nodes are rebooted. But there can be disadvantages to rebooting a failed node in a computing environment. For example, if the node only partially failed, the node may still be executing one or more jobs. Rebooting the node can interrupt or otherwise negatively affect these jobs. As another example, the node may have valuable job-data stored in memory (e.g., random access memory). Rebooting the node can cause the job data to be corrupted or erased.

Some examples of the present disclosure can mitigate one or more of the abovementioned issues by allocating jobs among nodes in a computing environment based on (i) the risks of the nodes failing, and (ii) the sensitivity of the jobs to failures. This can reduce the impact of node failures on jobs in the computing environment.

As a particular example, a computing environment can have multiple nodes for performing a variety of tasks. One of the nodes can be a management node for allocating jobs among the other nodes. To allocate the jobs among the other nodes, the management node can identify one or more risk factors associated with each node. A risk factor can be a property of a node that has led to a failure in the past. The management node can determine which risk factors apply to a node by comparing the node's characteristics (e.g., software characteristics, hardware characteristics, operational characteristics, network characteristics, or any combination of these) to known risk factors in a database. After identifying a node's risk factors, the management node can determine each risk factor's associated score. Each risk factor can have a corresponding score indicating a likelihood of the risk factor leading to a node failure. For example, a risk factor can have a score of eight if the risk factor results in a node failure 8% of the time. After determining the scores for the risk factors corresponding to a node, the management node can combine the scores into a risk score (e.g., an overall risk-score) for the node that indicates a likelihood of the node failing. The management node can repeat this process to determine a respective risk-score for each of the nodes. The management node can then allocate jobs among the nodes based on the risk scores for the nodes. For example, the management node can assign more-sensitive jobs to nodes with lower chances of failure, and less-sensitive jobs to nodes with higher chances of failure. Allocating jobs in this manner can reduce the impact of node failures on the jobs.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for managing node failure according to some aspects. The system 100 includes a client device 102, such as a laptop computer, desktop computer, mobile device, or any combination of these. The client device 102 is in communication with a computing environment 104, such as a cloud-computing environment or data grid. The client device 102 can be in communication with the computing environment 104 via a network, such as a local area network (LAN), a wide area network (WAN), or the Internet. The client device 102 can transmit a job request 118 to the computing environment 104 to cause a job to be performed in the computing environment 104.

The computing environment 104 can include any number and combination of nodes, such as nodes 106a-d. Examples of the nodes can include computing devices, servers, virtual machines, or any combination of these. One of the nodes can be a management node 106a. In some examples, the management node 106a can determine risk scores 108 for some or all of the other nodes 106b-d in the computing environment 104. In the example shown in FIG. 1, the management node 106a has determined a risk score of 25 for Node A, 51 for Node B, and 10 for Node C. But other combinations of risk scores are possible.

Figure 2:
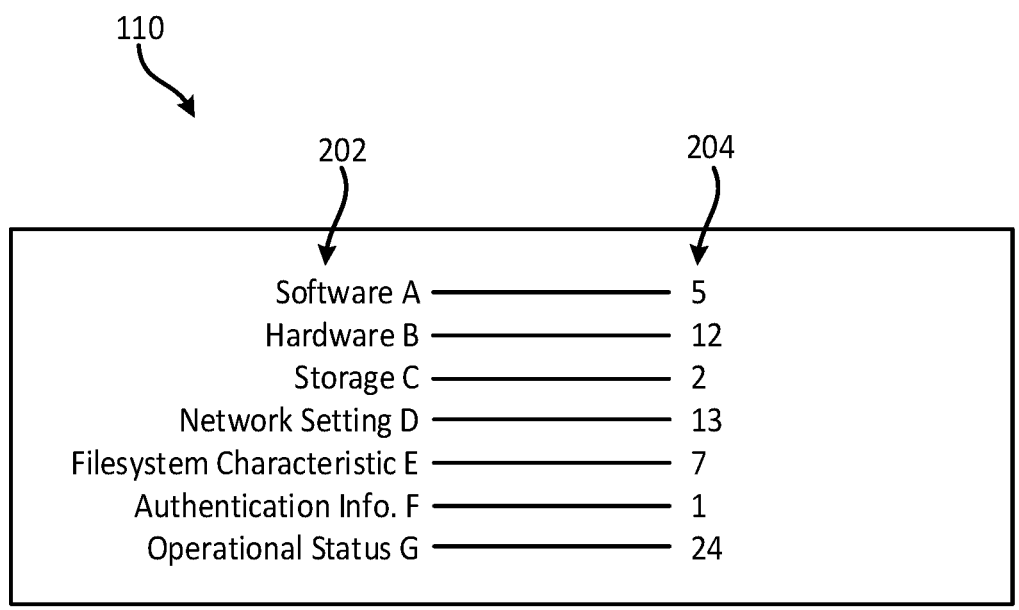
FIG. 2 is a block diagram of an example of a database according to some aspects.

The management node 106a can determine a risk score for a node 106b by first determining one or more risk factors associated with the node 106b. For example, the management node 106a can determine the node's characteristics by analyzing the node's (i) kernel settings; (ii) operational settings or status; (iii) software (e.g., operating system, applications, or libraries); (iv) network settings; (v) hardware, (e.g., processor or memory), (vi) filesystem settings, or (vii) any combination of these. The management node 106a can then compare the node's characteristics to known risk-factors in a database 110 to determine which risk factors are applicable to the node 106b. For example, as shown in FIG. 2, the database 110 can include the risk factors Software A, Hardware B, Storage C, Network Setting D, Filesystem Characteristic E, Authentication Information F, and Operational Status G. So, the management node 106a can analyze the node 106b to determine if it has one or more of these risk factors.

Next, the management node 106a can determine scores corresponding to the risk factors associated with the node 106b. In some examples, the management node 106a can determine the scores using the database 110, which can have relationships between risk factors 202 and scores 204 (e.g., as shown in FIG. 2). For example, the management node 106a can determine that the node 106b has the risk factors Software A and Network Setting D. So, the management node 106a can use the database 110 to correlate Software A to a score of five and Network Setting D to a score of thirteen.

The management node 106a can then determine the risk score for the node 106b based on the scores of the risk factors associated with the node 106b. For example, the management node 106a can add the score of five (for Software A) to the score of thirteen (for Network-Setting D) to determine a total score of 18, which the management node 106a can use as the risk score for the node 106b. The management node 106a can repeat the above process to determine a respective risk-score for some or all of the nodes 106a-c in the computing environment 104.

In some examples, the management node 106a can generate (e.g., automatically) the database 110 prior to determining the risk scores 108. The management node 106a can generate the database 110 by analyzing historical data 112 related to the operation of one or more nodes 106a-c during a prior time-period, such as a prior week, month, or year. For example, the historical data 112 can be log data that includes (i) information about node failures; and (ii) node characteristics around the times of the node failures, such as immediately before the failures. The management node 106a can analyze the historical data 112 to determine which node characteristics are potentially causes of the node failures. For example, the management node 106a can analyze the historical data 112 to determine that a particular kernel-setting is associated with (e.g., led to) at least one node failure. The management node 106a can then generate the database 110 by including these potential causes of node failures into the database 110 as risk factors. For example, the management node 106a can incorporate the particular kernel-setting into the database 110 as a risk factor. The management node 106a may additionally or alternatively identify other potential causes of node failures (e.g., the configuration of the computing environment 104 at the time of a node failure) in the historical data 112 and include the other potential causes as risk factors in the database 110.

The management node 106a can also determine scores for the potential causes of node failures discussed above. For example, the management node 106a can analyze the historical data 112 to determine how many times a node characteristic is associated with a node failure. The management node 106a can determine a score for the node characteristic based on the number of node failures associated with the node characteristic. For example, the management node 106a can divide (i) the number of node failures resulting from the node characteristic by (ii) the total number of node failures indicated in the historical data 112. The management node 106a can use this ratio to determine the score for the node characteristic. In one such example, the score for the node characteristic can be the percentage of the node failures that are attributable to the node characteristic. The management node 106a can use any number and combination of techniques to determine a score for a potential cause of failure. The management node 106a can then include the score in the database 110 to generate the database 110.

After determining the risk scores for the nodes 106a-d using the database 110, the management node 106a can determine a risk-tolerance score 114 for a job to be executed in the computing environment 104. The risk-tolerance score 114 can indicate the susceptibility of the job to a failure of one or more nodes 106a-d in the computing environment 104. For example, a higher risk-tolerance score may indicate that the job is influenced to a small degree, or not at all, by a node failure. And a lower risk-tolerance score may indicate that the job is influenced to a large degree, or completely compromised, by a node failure.

The management node 106a may determine the risk-tolerance score 114 for the job based on a number of replicas associated with the job. A replica can be a copy of data associated with a job. For example, as part of the process of executing a job, the computing environment 104 can generate multiple replicas of data associated with the job. The replicas may be configured to (i) serve as backups of the data, (ii) enable the job to be executed using multiple nodes, (iii) distribute information related to the job among multiple nodes, or (iv) any combination of these. And more replicas may result in a higher tolerance of the job to a node failure. So, the management node 106a can determine a higher risk-tolerance score 114 if there are a higher number of replicas associated with the job, and a lower risk-tolerance score 114 if there are a lower number of replicas associated with the job. For example, the management node 106a can determine a risk-tolerance score 114 of ten if the job has ten replicas, and a risk-tolerance score 114 of five if the job has five replicas. The number of replicas to be generated for a job can be based on a priority of the job, a user preference, or both.

After determining the risk-tolerance score 114 for the job, the management node 106a can allocate the job to one or more nodes 106a-d based on the risk-tolerance score 114 for the job and the risk scores 108 for the nodes 106a-d. For example, the management node 106a can determine that the risk-tolerance score 114 for the job is lower, which can mean that the job has a higher susceptibility to node failures. So, the management node 106a can allocate the job to Node C, which has a lower risk-score (e.g., 10) than Nodes A and B. As another example, the management node 106a can determine that the risk-tolerance score 114 for the job is higher, which can mean that the job has a lower susceptibility to node failures. So, the management node 106a can allocate the job to Node B, which has a higher risk-score (e.g., 51) than Nodes A and C.

In some examples, the management node 106a can determine whether or not to allocate a job to a node based on (i) the risk-tolerance score 114 for the job being in a particular risk-tolerance score range, (ii) the risk score for the node being in a particular risk-score range, or (iii) both of these. For example, the management node 106a can determine that the risk-tolerance score 114 is within a particular risk-tolerance score range among multiple possible risk-tolerance score ranges. The management node 106a can also determine that the risk score for the node is within a particular risk-score range among multiple possible risk-score ranges. The management node 106a can then assign the job to the node based on the risk-tolerance score 114 being in the particular risk-tolerance score range and the risk score being in the particular risk-score range. For example, if the job is associated with a risk-tolerance score range that is above a first threshold, the management node 106a can assign the job to a node that is associated with a risk-score range that is above a second threshold. And if the job is associated with another risk-tolerance score range that is below the first threshold, the management node 106a can assign the job to another node that is associated with another risk-score range that is below the second threshold.

Allocating (e.g., assigning) a job to a node may involve causing a replica associated with the job to be generated on the node. For example, the management node 106a can assign a job to nodes 106b-d by causing replicas 116a-c of the job to be generated on the nodes 106b-d. The nodes 106b-d may then each execute (e.g., sequentially or in parallel) the job or respective portions of the job using the replicas 116a-c.

In some examples, the management node 106a can allocate replicas for a job among the nodes 106a-d based on a combined risk-score associated with the nodes. For example, the management node 106a may allocate replicas among available nodes, regardless of their risk scores, until an aggregate value of their risk scores meets or exceeds a combined risk-score threshold. As a particular example, the management node 106a may allocate replica 116a to Node A, which has a risk score of 25. And the management node 106a may allocate replica 116b to Node B, which has a risk score of 51. The management node 106a may then determine that the combined risk-score for Nodes A and B is 76 (25+51), which exceeds a combined risk-score threshold of 75. And a combined risk-score of more than 75 may indicate a high likelihood of at least one of the nodes 106b-c failing. So, the management node 106a may allocate another replica to Node C, which can have a risk score that is below a predetermined threshold associated with a lower risk of node failure. For example, the management node 106a can allocate replica 116c to Node C, because Node C has a risk score of 10, which may be below a predetermined threshold of 15. This can help ensure that the job is at least partially executed on a node with a lower risk of failure, since Nodes A and B have a higher risk of node failure. Some examples can involve several combined-risk-score thresholds arranged in tiers, so that replicas 116a-c can be distributed among nodes in a tiered manner. For example, the replicas 116a-c can be distributed among the nodes by starting with higher-risk nodes and switching to progressively lower-risk nodes as each combined-risk-score threshold is passed. This may result in a more balanced distribution of the replicas among nodes with various levels of risk.

The example shown in FIG. 1 is illustrative, but various modifications are possible. For example, although the nodes 106a-d are shown as being internal to the computing environment 104, in other examples some or all of the nodes can be external to the computing environment 104. As another example, although FIG. 1 depicts the management node 106a as a single node, in other examples the management node 106a can include multiple nodes collectively working together to perform some or all of the functions described herein. Further, while certain components are depicted in FIG. 1 as being internal or external to the management node 106a, other examples can involve other configurations of the components. For example, the database 110, historical data 112, risk scores 108, risk-tolerance score 114, or any combination of these, can be separate from the management node 106a and accessible to the management node 106a via a network. And while certain steps were discussed above as being in a certain order for ease of understanding, other examples can involve a different order of the steps discussed above.

Figure 3:
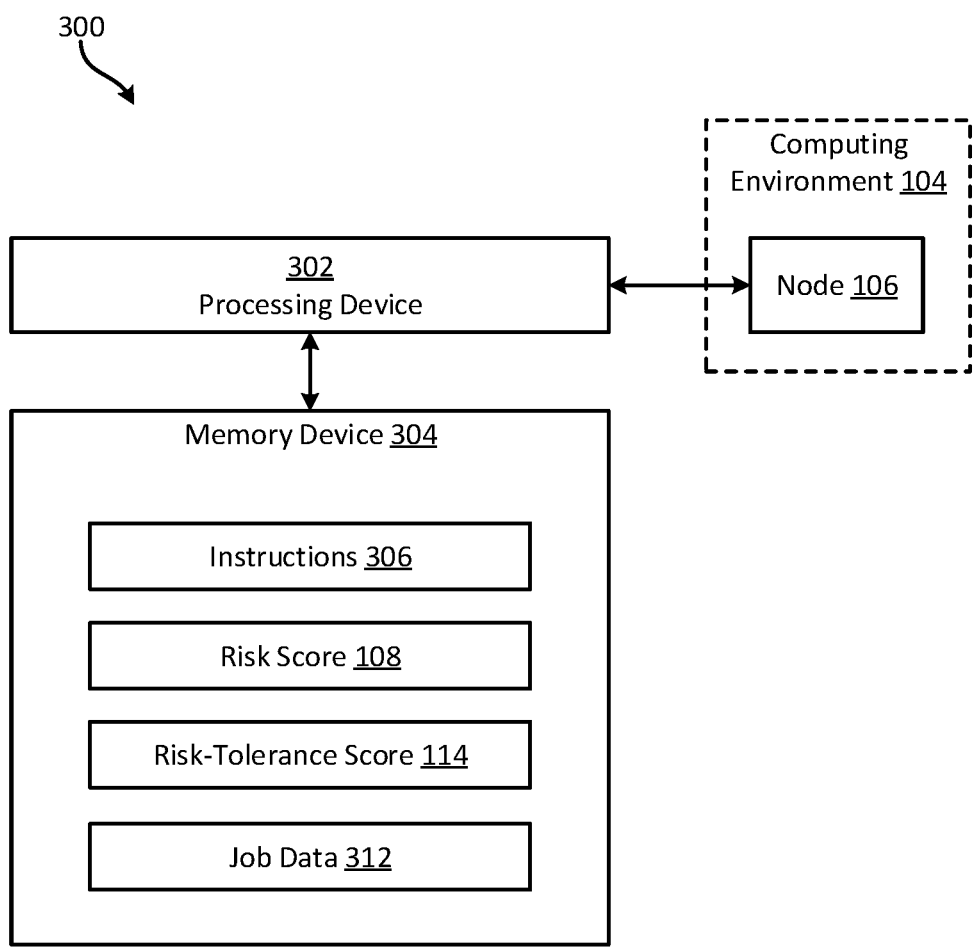
FIG. 3 is a block diagram of another example of a system for managing node failures in a computing environment according to some aspects.

FIG. 3 is a block diagram of another example of a system 300 for managing node failures in a computing environment 104 according to some aspects. The system 300 includes a processing device 302 communicatively coupled to a memory device 304. In some examples, the processing device 302 and the memory device 304 can be housed in a single device, such as management node 106a. In other examples, the processing device 302 and the memory device 304 can be distributed from one another.

The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions 306. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the memory device 304 can include a risk score 108 for a node 106 in the computing environment 104, a risk-tolerance score 114 for a job to be at least partially executed in the computing environment 104, or both. Additionally or alternatively, the memory device 304 can include job data 312 that is associated with the job. Examples of the job data 312 can include a type of the job, a number of replicas that are to be associated with the job, a size of the job, a priority associated with the job, or any combination of these.

In some examples, the processing device 302 can determine the risk score 108 for the node 106 by analyzing historical data associated with the node 106. The processing device 302 can additionally or alternatively determine the risk-tolerance score 114 by analyzing the job data 312. The processing device 302 can then allocate the job to one or more nodes based on the risk score 108, the risk-tolerance score 114, or both. For example, the processing device 302 can allocate the job to the node 106 using the risk score 108 for the node 106 and the risk-tolerance score 114 for the job.

Figure 4:
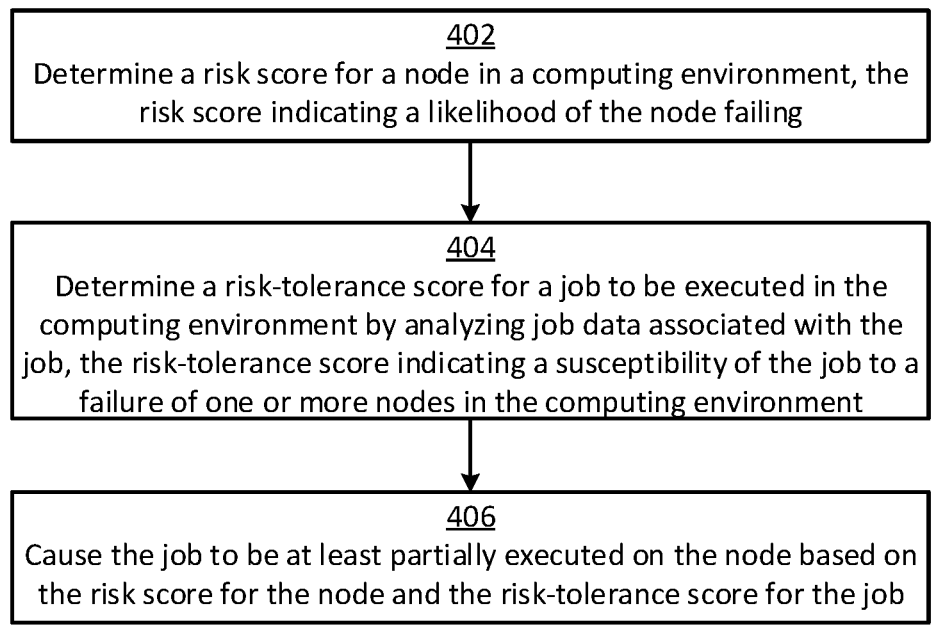
FIG. 4 is a flow chart showing an example of a process for managing node failures in a computing environment according to some aspects.

In some examples, the system 300 can implement the process shown in FIG. 4. Other examples can include more steps, fewer steps, different steps, or a different order of the steps than are depicted in FIG. 4. The steps of FIG. 4 are described with reference to the components discussed above with regard to FIG. 3.

In block 402, a processing device 302 determines a risk score 108 for a node 106 in a computing environment 104. The risk score 108 can indicate a likelihood of the node 106 failing (e.g., partially or completely). In some examples, a higher risk-score may indicate a higher likelihood of failing, and a lower risk-score can indicate a lower likelihood of failing. The processing device 302 can determine the risk score 108 at least in part by correlating zero or more risk factors associated with the node 106 to scores in a database, such as database 110 of FIG. 1. The processing device 302 may then aggregate the scores or apply an algorithm to the scores to determine the risk score 108 for the node 106.

In block 404, the processing device 302 determines a risk-tolerance score 114 for a job to be executed in the computing environment 104 by analyzing job data 312 associated with the job. The risk-tolerance score 114 can indicate a susceptibility of the job to a failure of one or more nodes (e.g., in the computing environment 104 or externally to the computing environment 104). In some examples, the processing device 302 determines a risk-tolerance score 114 that is proportional to the number of replicas associated with the job. In other examples, the processing device 302 can apply another algorithm to the number of replicas to determine the risk-tolerance score 114. The processing device 302 can additionally or alternatively consider other information to determine the risk-tolerance score 114. For example, the processing device 302 can determine the risk-tolerance score 114 for the job based on a priority of the job, a type of the job, a size of the job, or any combination of these.

In block 406, the processing device 302 causes the job to be at least partially executed on the node 106 based on the risk score 108 for the node 106 and the risk-tolerance score 114 for the job. This may involve transmitting one or more electronic communications to the node 106; configuring the computing environment 104 in a particular manner; or both. For example, the processing device 302 can cause the job to be executed on the node 106 by transmitting a command, job data 312, or both to the node 106. In some examples, the processing device 302 can cause the job to be at least partially executed on the node 106 by providing a replica of the job to the node 106 or causing the replica to be generated at the node 106.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

The invention claimed is:

1. A system comprising:
a processing device; and
a non-transitory computer-readable medium including instructions that are executable by the processing device for causing the processing device to:
determine a risk score for a node in a computing environment, the risk score indicating a likelihood of the node failing;
determine a risk-tolerance score for a job to be executed in the computing environment by analyzing job data associated with the job, the risk-tolerance score indicating a susceptibility of the job to a failure of one or more nodes in the computing environment; and
cause the job to be at least partially executed on the node based on the risk score for the node and the risk-tolerance score for the job.

2. The system of claim 1, wherein the non-transitory computer-readable medium further includes instructions that are executable by the processing device for causing the processing device to determine the risk score for the node by:
determining a plurality of risk factors for the node;
determining that the plurality of risk factors corresponds to a plurality of scores in a database; and
combining the plurality of scores to determine the risk score for the node.

3. The system of claim 2, wherein:
the plurality of risk factors includes at least one of (i) the node having particular software, (ii) the node having particular hardware, (iii) the node using a particular type of storage; (iv) the node having a particular network-setting, (v) the node having a particular file-system-characteristic, (vi) the node having particular authentication-information, or (vii) the node having a particular operational-status; and
wherein the non-transitory computer-readable medium further includes instructions that are executable by the processing device for causing the processing device to determine the plurality of risk factors for the node by analyzing the node.

4. The system of claim 2, wherein the non-transitory computer-readable medium further includes instructions that are executable by the processing device for causing the processing device to generate the database by:
identifying a cause of a node failure during a prior time-period by analyzing historical data for one or more nodes;
determine a number of failures associated with the cause during the prior time-period by analyzing the historical data;
determining a corresponding score for the cause based on the number of failures associated with the cause during the prior time-period; and
generating the database by including the cause and the corresponding score in the database.

5. The system of claim 1, wherein the non-transitory computer-readable medium further includes instructions that are executable by the processing device for causing the processing device to:
determine a number of replicas to be generated in the computing environment for the job; and
determine the risk-tolerance score for the job using the number of replicas to be generated in the computing environment.

6. The system of claim 1, wherein the non-transitory computer-readable medium further includes instructions that are executable by the processing device for causing the processing device to, prior to causing the job to be at least partially executed on the node:
determine that the risk score for the node is in a particular risk-score range among a plurality of risk-score ranges;
determine that the risk-tolerance score for the job is in a particular risk-tolerance score range among a plurality of risk-tolerance score ranges; and
at least partially assign the job to the node based on the risk score for the node being in the particular risk-score range and the risk-tolerance score for the job being in the particular risk-tolerance score range.

7. The system of claim 1, wherein the node is one of a plurality of nodes in the computing environment and the risk score is one of a plurality of risk scores for the plurality of nodes, and wherein the non-transitory computer-readable medium further includes instructions that are executable by the processing device for causing the processing device to:
  determine the plurality of risk scores for the plurality of nodes by:
    analyzing the plurality of nodes to determine a plurality of risk factors corresponding to the plurality of nodes; and
    correlating the plurality of risk factors to corresponding scores in a database;
  determine that each risk score in the plurality of risk scores meets or exceeds a predefined risk-score threshold;
  in response to determining that each risk score in the plurality of risk scores meets or exceeds the predefined risk-score threshold, determine that the job is to be executed using the plurality of nodes; and
  in response to determining that the job is to be executed using the plurality of nodes, causing the job to be executed using the plurality of nodes.

8. A method comprising:
  determining, by a processing device, a risk score for a node in a computing environment, the risk score indicating a likelihood of the node failing;
  determining, by the processing device, a risk-tolerance score for a job to be executed in the computing environment by analyzing job data associated with the job, the risk-tolerance score indicating a susceptibility of the job to a failure of one or more nodes in the computing environment; and
  causing, by the processing device, the job to be at least partially executed on the node based on the risk score for the node and the risk-tolerance score for the job.

9. The method of claim 8, further comprising determining the risk score for the node by:
  determining a plurality of risk factors for the node;
  determining that the plurality of risk factors corresponds to a plurality of scores in a database; and
  combining the plurality of scores to determine the risk score for the node.

10. The method of claim 9, wherein the plurality of risk factors includes at least one of (i) the node having particular software, (ii) the node having particular hardware, (iii) the node using a particular type of storage; (iv) the node having a particular network-setting, (v) the node having a particular filesystem-characteristic, (vi) the node having particular authentication-information, or (vii) the node having a particular operational-status; and
  further comprising determining the plurality of risk factors for the node by analyzing the node.

11. The method of claim 9, further comprising generating the database by:
  identifying a cause of a node failure during a prior time-period by analyzing historical data for one or more nodes;
  determine a number of failures associated with the cause during the prior time-period by analyzing the historical data;
  determining a corresponding score for the cause based on the number of failures associated with the cause during the prior time-period; and
  generating the database by including the cause and the corresponding score in the database.

12. The method of claim 8, further comprising determining a number of replicas to be generated in the computing environment for the job; and
  determining the risk-tolerance score for the job based on the number of replicas to be generated in the computing environment.

13. The method of claim 8, further comprising, prior to causing the job to be at least partially executed on the node:
  determining that the risk score for the node is in a particular risk-score range among a plurality of risk-score ranges;
  determining that the risk-tolerance score for the job is in a particular risk-tolerance score range among a plurality of risk-tolerance score ranges; and
  at least partially assigning the job to the node based on the risk score for the node being in the particular risk-score range and the risk-tolerance score for the job being in the particular risk-tolerance score range.

14. The method of claim 8, wherein the node is a first node and the risk score is a first risk-score, and further comprising:
  causing a first replica associated with the job to be generated on the first node;
  determining a second risk-score for a second node in the computing environment;
  causing a second replica associated with the job to be generated on the second node;
  determining a combined risk-score by aggregating the first risk-score and the second risk-score;
  determining that the combined risk-score meets or exceeds a combined risk-score threshold;
  determining a third risk-score for a third node in the computing environment; and
  in response to determining (i) that the combined risk-score meets or exceeds the combined risk-score threshold, and (ii) that the third risk-score is below a predetermined threshold, causing a third replica associated with the job to be generated on the third node.

15. A non-transitory computer-readable medium comprising program code that is executable by a processing device for causing the processing device to:
  determine a risk score for a node in a computing environment, the risk score indicating a likelihood of the node failing;
  determine a risk-tolerance score for a job to be executed in the computing environment by analyzing job data associated with the job, the risk-tolerance score indicating a susceptibility of the job to a failure of one or more nodes in the computing environment; and
  cause the job to be at least partially executed on the node based on the risk score for the node and the risk-tolerance score for the job.

16. The non-transitory computer-readable medium of claim 15, further comprising program code that is executable by the processing device for causing the processing device to determine the risk score for the node by:
  determining a plurality of risk factors for the node;
  determining that the plurality of risk factors corresponds to a plurality of scores in a database; and
  combining the plurality of scores to determine the risk score for the node.

17. The non-transitory computer-readable medium of claim 16, wherein:
  the plurality of risk factors includes at least one of (i) the node having particular software, (ii) the node having particular hardware, (iii) the node using a particular type of storage; (iv) the node having a particular network-setting, (v) the node having a particular filesystem-characteristic, (vi) the node having particular authentication-information, or (vii) the node having a particular operational-status; and further comprising program code that is executable by the processing device for causing the processing device to determine the plurality of risk factors for the node by analyzing the node.

18. The non-transitory computer-readable medium of claim 16, further comprising program code that is executable by the processing device for causing the processing device to generate the database by:

identifying a cause of a node failure during a prior time-period by analyzing historical data for one or more nodes;

determine a number of failures associated with the cause during the prior time-period by analyzing the historical data;

determining a corresponding score for the cause based on the number of failures associated with the cause during the prior time-period; and generating the database by including the cause and the corresponding score in the database.

19. The non-transitory computer-readable medium of claim 15, further comprising program code that is executable by the processing device for causing the processing device to:

determine a number of replicas to be generated in the computing environment for the job; and determine the risk-tolerance score for the job based on the number of replicas to be generated in the computing environment.

20. The non-transitory computer-readable medium of claim 15, further comprising program code that is executable by the processing device for causing the processing device to, prior to causing the job to be at least partially executed on the node:

determine that the risk score for the node is in a particular risk-score range among a plurality of risk-score ranges;

determine that the risk-tolerance score for the job is in a particular risk-tolerance score range among a plurality of risk-tolerance score ranges; and at least partially assign the job to the node based on the risk score for the node being in the particular risk-score range and the risk-tolerance score for the job being in the particular risk-tolerance score range.

* * * * *